(12) United States Patent
Xu et al.

(10) Patent No.: US 11,449,408 B2
(45) Date of Patent: Sep. 20, 2022

(54) METHOD, DEVICE, AND COMPUTER PROGRAM PRODUCT FOR OBTAINING DIAGNOSTIC INFORMATION

(71) Applicant: EMC IP Holding Company LLC, Hopkinton, MA (US)

(72) Inventors: Maoyang Xu, JiangSu (CN); Fang Du, Guangyuan (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/027,087

(22) Filed: Sep. 21, 2020

(65) Prior Publication Data

US 2021/0303435 A1 Sep. 30, 2021

(30) Foreign Application Priority Data

Mar. 26, 2020 (CN) .......................... 202010225309.6

(51) Int. Cl.
| | |
|---|---|
| *G06F 11/00* | (2006.01) |
| *G06F 11/32* | (2006.01) |
| *G06F 11/07* | (2006.01) |
| *G06F 11/30* | (2006.01) |

(52) U.S. Cl.
CPC .......... *G06F 11/327* (2013.01); *G06F 11/079* (2013.01); *G06F 11/3075* (2013.01); *G06F 11/321* (2013.01)

(58) Field of Classification Search
CPC ............. G06F 11/0766; G06F 11/0769; G06F 11/0772; G06F 11/0775; G06F 11/0781; G06F 11/0784; G06F 11/321; G06F 11/322; G06F 11/326; G06F 11/327; G06F 11/00–0796; G06F 11/08–1425; G06F 11/1428–3696; G06F 11/3075; G06F 11/079; G06F 11/3055; G06F 11/3476
USPC ...................................................... 714/1–57
See application file for complete search history.

(56) References Cited

U.S. PATENT DOCUMENTS

| | | | | |
|---|---|---|---|---|
| 5,619,645 | A | * | 4/1997 | Montenegro ......... H04L 69/162 714/48 |
| 7,810,071 | B2 | * | 10/2010 | Thebes ................. G06F 11/366 717/124 |
| 8,683,563 | B1 | | 3/2014 | Van Dijk et al. |
| 10,698,605 | B2 | | 6/2020 | Liu et al. |
| 2002/0174380 | A1 | * | 11/2002 | Mannarsamy ...... G06F 11/0748 714/25 |
| 2006/0143494 | A1 | * | 6/2006 | Bouat ..................... H04L 69/32 714/4.11 |
| 2006/0143498 | A1 | * | 6/2006 | Hataski ............. G06F 11/2028 714/6.32 |

(Continued)

*Primary Examiner* — Sarai E Butler
(74) *Attorney, Agent, or Firm* — BainwoodHuang

(57) ABSTRACT

Techniques may involve determining, according to determination that a received system alarm corresponds to a predefined to-be-monitored alarm, the received system alarm as a target system alarm. The techniques may further involve determining a system module corresponding to the target system alarm based on a predefined mapping relationship between the system alarm and the system module. In addition, the techniques may further involve acquiring the system diagnostic information of the system module which is associated with the target system alarm. In this way, time for collecting system diagnostic information can be reduced and user experience can be improved.

13 Claims, 4 Drawing Sheets

(56) References Cited

U.S. PATENT DOCUMENTS

| | | | | |
|---|---|---|---|---|
| 2008/0215922 A1* | 9/2008 | Cheng | .................... | G06F 11/366 |
| | | | | 714/39 |
| 2008/0222456 A1* | 9/2008 | Jones | .................. | G06F 11/0778 |
| | | | | 714/45 |
| 2008/0301506 A1* | 12/2008 | Chang | .................. | H04L 43/065 |
| | | | | 714/57 |
| 2010/0121908 A1* | 5/2010 | Nulkar | ................ | H04L 67/1097 |
| | | | | 709/203 |
| 2011/0060948 A1* | 3/2011 | Beebe | ...................... | H04L 43/16 |
| | | | | 714/37 |
| 2012/0023375 A1* | 1/2012 | Dutta | .................. | G06F 11/0754 |
| | | | | 714/47.2 |
| 2012/0137165 A1* | 5/2012 | Wu | ..................... | G06F 11/2028 |
| | | | | 714/4.11 |
| 2012/0192008 A1* | 7/2012 | Suzuki | .................. | G06F 11/079 |
| | | | | 714/15 |
| 2012/0266234 A1* | 10/2012 | Ocko | ...................... | H04L 69/40 |
| | | | | 714/E11.073 |
| 2013/0166967 A1* | 6/2013 | Jerde | .................. | G06F 11/0709 |
| | | | | 714/48 |
| 2014/0281667 A1* | 9/2014 | Yu | ....................... | H04L 41/0672 |
| | | | | 714/4.1 |
| 2015/0074455 A1* | 3/2015 | Li | ....................... | G06F 11/0751 |
| | | | | 714/15 |
| 2015/0242236 A1* | 8/2015 | Nakazono | ........... | G06F 11/3055 |
| | | | | 718/1 |
| 2015/0358208 A1* | 12/2015 | Jewell | .................... | H04L 43/04 |
| | | | | 709/224 |
| 2016/0203060 A1* | 7/2016 | Singh | .................. | G06F 11/1469 |
| | | | | 714/19 |
| 2019/0266070 A1* | 8/2019 | Bhandarkar | ........ | G06F 11/3644 |
| 2019/0286546 A1* | 9/2019 | Johnston | ................ | G06F 11/006 |

* cited by examiner

METHOD, DEVICE, AND COMPUTER PROGRAM PRODUCT FOR OBTAINING DIAGNOSTIC INFORMATION

CROSS-REFERENCE TO RELATED APPLICATION

This application claims priority to Chinese Patent Application No. CN202010225309.6, on file at the China National Intellectual Property Administration (CNIPA), having a filing date of Mar. 26, 2020, and having "METHOD, DEVICE, AND COMPUTER PROGRAM PRODUCT FOR OBTAINING DIAGNOSTIC INFORMATION" as a title, the contents and teachings of which are herein incorporated by reference in their entirety.

TECHNICAL FIELD

Embodiments of the present disclosure generally relate to the field of computer networks, and in particular, to a method and an electronic device for acquiring system diagnostic information, and a computer program product.

BACKGROUND

When an abnormality or failure occurs in a system, a user usually feeds failure information back to a system developer. In order to solve the system abnormality or failure, the system developer usually collects diagnostic information related to the system abnormality or failure from an on-site technical support professional, and the on-site technical support professional may also attempt to acquire relevant test data by reproducing the system abnormality and failure. These tasks require the on-site technical support professional to contact the user multiple times for collecting diagnostic information sufficient to solve the system abnormality or failure. Therefore, this multi-party communication process usually takes a long time and requires a lot of human resources. In addition, due to the need for repeated communications and the excessive long period for problem solving, it is likely to result in poor user experience.

SUMMARY OF THE INVENTION

Embodiments of the present disclosure relate to a method and a device for acquiring system diagnostic information, and a computer program product.

In a first aspect of the present disclosure, a method for acquiring system diagnostic information is provided. The method may include determining, according to determination that a received system alarm corresponds to a predefined to-be-monitored alarm, the received system alarm as a target system alarm. The method may further include determining a system module corresponding to the target system alarm based on a predefined mapping relationship between the system alarm and the system module. In addition, the method may further include acquiring the system diagnostic information of the system module which is associated with the target system alarm.

In a second aspect of the present disclosure, an electronic device is provided. The device includes: at least one processing unit; and at least one memory coupled to the at least one processing unit and storing instructions configured to be executed by the at least one processing unit, wherein when executed by the at least one processing unit, the instructions cause the device to perform actions including: determining, according to determination that a received system alarm corresponds to a predefined to-be-monitored alarm, the received system alarm as a target system alarm; determining a system module corresponding to the target system alarm based on a predefined mapping relationship between the system alarm and the system module; and acquiring the system diagnostic information of the system module which is associated with the target system alarm.

In a third aspect of the present disclosure, a computer program product is provided. The computer program product is tangibly stored in a non-transitory computer-storage medium and including machine-executable instructions. When executed by a device, the machine-executable instructions cause the device to perform any step of the method described according to the first aspect of the present disclosure.

The summary is provided to introduce the choice of concepts in a simplified form, which will be further described in the following Detailed Description. The summary is neither intended to identify key features or necessary features of the present disclosure, nor intended to limit the scope of the present disclosure.

BRIEF DESCRIPTION OF THE DRAWINGS

The above and other objectives, features, and advantages of the present disclosure will become more apparent based on a more detailed description of example embodiments of the present disclosure with reference to the accompanying drawings, wherein identical reference numerals generally represent identical components in the example embodiments of the present disclosure.

Identical or corresponding numerals represent identical or corresponding parts in various drawings.

DETAILED DESCRIPTION

Figure 1:
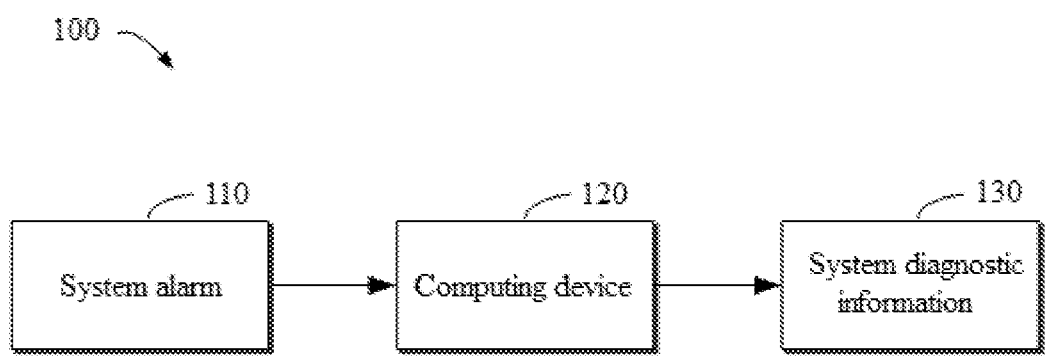
FIG. 1 is a schematic diagram of an example environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be appreciated that the present disclosure can be implemented in various forms and should not be limited by the embodiments described here. In contrast, the embodiments are provided to make the present disclosure more thorough and complete, and to fully convey the scope of the present disclosure to those skilled in the art.

The term "include" and its variants as used herein indicate non-exclusive inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, in a conventional process of collecting system diagnostic information, a system developer usually collects diagnostic information related to system abnormality or failure through an on-site technical support professional, and the on-site technical support professional needs to contact a user possibly multiple times for collecting system diagnostic information sufficient to solve the system abnormality or failure. This kind of manual feedback mechanism based on operators (such as the user and the technical support professional) has the disadvantages of being time-consuming and complicated, and wasting human resources.

In order to solve the above problems and improve user experience, a mechanism for automatically collecting system diagnostic information is proposed in an example embodiment of the present disclosure, and the collected system diagnostic information may be subdivided for specific modules in the system, so as to provide system developers of the modules with a reliable basis as much as possible for debugging the system.

FIG. 1 is a schematic diagram of an example environment in which embodiments of the present disclosure can be implemented. In example environment 100, system alarm 110 can alert a user that a potential problem exists in the system or a problem event is happening in the system. It should be appreciated that the above example is merely description of the present disclosure, but not a specific limitation to the present disclosure.

As shown in FIG. 1, system alarm 110 is input to computing device 120 for effectively utilizing system alarm 110. In some embodiments, computing device 120 may include, but is not limited to, a personal computer, a server computer, a handheld or laptop device, a mobile device (such as a mobile phone, a personal digital assistant (PDA), and a media player), a multiprocessor system, a consumer electronic product, a small computer, a mainframe computer, a distributed computing environment including any of the above systems or devices, and the like.

After processing by computing device 120, system diagnostic information 130 corresponding to system alarm 110 may be collected based on system alarm 110. All system diagnostic information 130 for analysis will be quickly collected after system alarm 110 is generated. By using collected system diagnostic information 130, a developer no longer needs to wait for a long time, thus saving a lot of time and a lot of human resources.

It should be appreciated that the environment shown in FIG. 1 is merely by way of example, but not a specific limitation to the present disclosure. The number and structure of components and the arrangement of the environment in the embodiment shown in FIG. 1 are examples for description, and are not intended to limit the present disclosure in any way.

Figure 2:
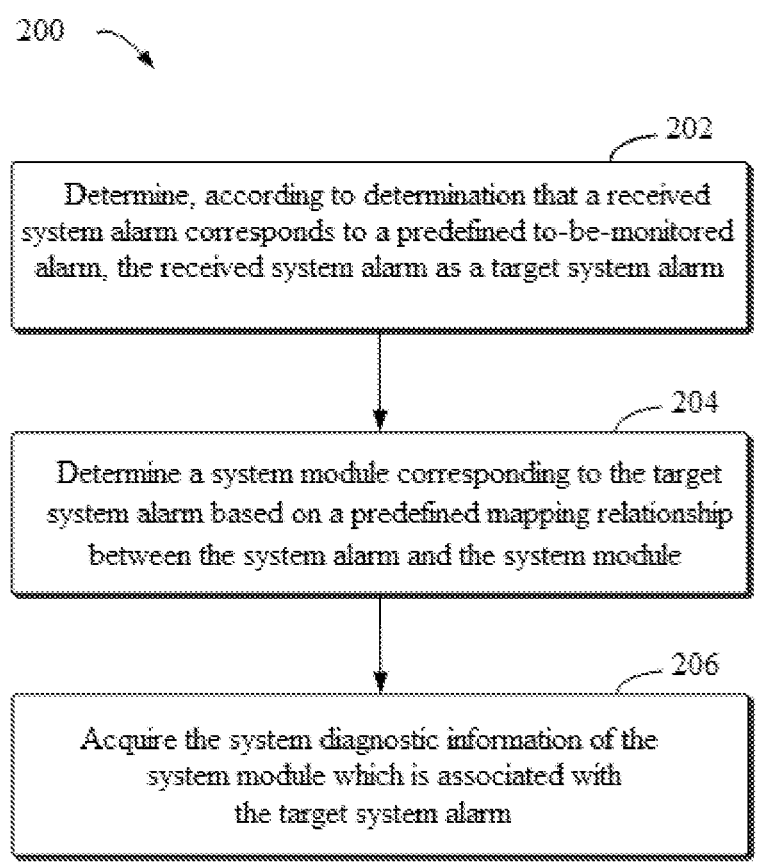
FIG. 2 is a flowchart of a process for acquiring system diagnostic information according to an embodiment of the present disclosure.

FIG. 2 is a flowchart of process 200 for acquiring system diagnostic information 130 according to an embodiment of the present disclosure. In some embodiments, process 200 may be performed by computing device 120 in FIG. 1. As an example, process 200 may be implemented in example environment 100 shown in FIG. 1. Process 200 for acquiring system diagnostic information 130 according to an embodiment of the present disclosure will now be described with reference to FIG. 2. For ease of understanding, the specific situations mentioned in the description below are by way of example, and are not used to limit the protection scope of the present disclosure.

In 202, computing device 120 may determine, according to determination that received system alarm 110 corresponds to a predefined to-be-monitored alarm, received system alarm 110 as a target system alarm. As an example, when computing device 120 receives system alarm 110, computing device 120 first determines whether system alarm 110 belongs to a to-be-monitored alarm. According to actual needs, a system developer, an on-site technical support professional, and even a user can preset system alarms that need to be monitored, and computing device 120 is only configured to monitor preset to-be-monitored alarms. If system alarm 110 belongs to the to-be-monitored alarms, system alarm 110 is marked as the target system alarm for subsequent processing. If system alarm 110 does not belong to the to-be-monitored alarms, process 200 exits. In this way, the system developer can purposefully monitor specific system alarms based on experience. Alternatively, the predefined to-be-monitored alarms may also be set as all system alarms. In other words, computing device 120 can monitor all system alarms.

In 204, computing device 120 may determine a system module corresponding to the target system alarm based on a predefined mapping relationship between the system alarm and the system module. It should be appreciated that any system includes multiple system modules, and each system module is developed and maintained by a corresponding system developer. Therefore, the system developer can preset a correspondence relationship, i.e., a mapping relationship, between each to-be-monitored system alarm and a system module. The mapping relationship may be stored as a database in a storage apparatus that is physically or communicatively connected to computing device 120. In this way, computing device 120 may specifically collect diagnostic information related to system alarms. A system developer responsible for developing and maintaining a system module does not need to consult and analyze diagnostic information related to another system module, thereby saving human resources.

Figure 3:
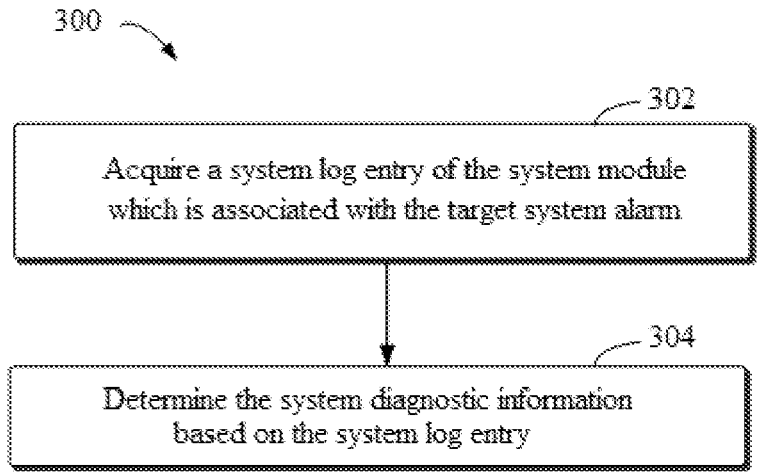
FIG. 3 is a flowchart of an example process for acquiring system diagnostic information according to an embodiment of the present disclosure.

In 206, computing device 120 may acquire system diagnostic information 130 of the system module which is associated with the target system alarm. In some embodiments, system diagnostic information 130 acquired by computing device 120 is mainly a system log entry related to the system module. Specifically, FIG. 3 is a flowchart of example process 300 for acquiring system diagnostic information 130 according to an embodiment of the present disclosure. In some embodiments, process 300 may be performed by computing device 120 in FIG. 1. As an example, process 300 may be implemented in example environment 100 shown in FIG. 1. Process 300 for acquiring system diagnostic information 130 according to an embodiment of the present disclosure will now be described with reference to FIG. 3. For ease of understanding, the specific situations mentioned in the description below are by way of example, and are not used to limit the protection scope of the present disclosure.

In 302, computing device 120 may acquire a system log entry of the above system module which is associated with the target system alarm. In other words, once a system alarm is issued by a system, all system log entries associated with the system module corresponding to the system alarm are collected. The system developer can consult the collected system log entries to analyze and process problems in the system.

In 304, computing device 120 may determine system diagnostic information 130 based on the system log entry. After all the above system log entries are acquired, computing device 120 may generate system diagnostic information 130 in the form of a file from these system log entries. In this way, all required system diagnostic information can be collected after the system alarm is triggered, so that the developer can collect diagnostic information in a laboratory without the need for long-term communication with the on-site technical support professional or even the user, which significantly saves human resources.

It should be appreciated that, in addition to the above manner of directly acquiring system log entries, computing device 120 may also acquire detection data by detecting a system module based on a target system alarm, and determine the system diagnostic information based on the detection data. The above process of acquiring the detection data needs to be further described in detail below.

Figure 4:
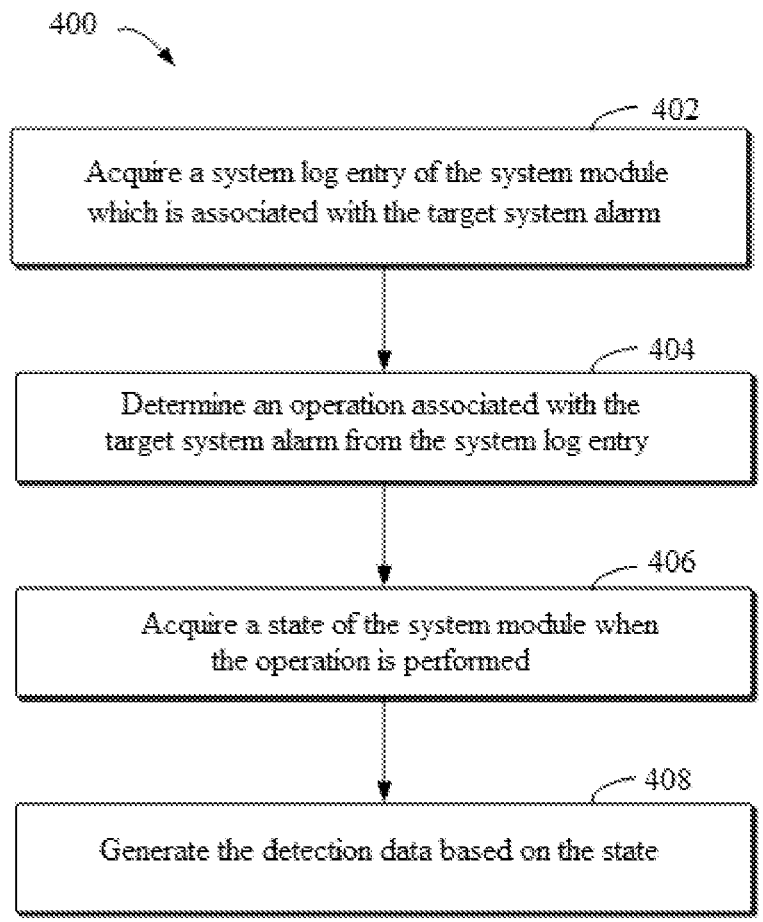
FIG. 4 is a flowchart of an example process for generating detection data as system diagnostic information according to an embodiment of the present disclosure.

FIG. 4 is a flowchart of example process 400 for generating detection data as system diagnostic information according to an embodiment of the present disclosure, in which a specific process of collecting system diagnostic information 130 is shown. In some embodiments, process 400 may be performed by computing device 120 in FIG. 1. As an example, process 400 may be implemented in example environment 100 shown in FIG. 1. Process 400 for generating detection data according to an embodiment of the present disclosure will now be described with reference to FIG. 4. For ease of understanding, the specific data mentioned in the description below are by way of example, and are not used to limit the protection scope of the present disclosure.

In 402, computing device 120 may acquire a system log entry of the system module which is associated with the target system alarm. In some embodiments, computing device 120 may enable logging to collect all log entries associated with the target system alarm. As an example, a debug log of a specific module may be started through a specific instruction.

In 404, computing device 120 may determine an operation associated with the target system alarm from the system log entry. In some embodiments, in order to reproduce the above problem event associated with the system alarm, a relevant operation that causes the problem event may be determined based on the system log entry. As an example, all packets of the system interface can be captured through specific instructions.

In 406, computing device 120 may acquire a state of the system module when the above operations are performed. As an example, if the problem event is that a user of a network file system (NFS) cannot access an NFS share, a state of the system module in this situation may be recorded by reproducing the situation. For example, the connectivity of a file interface may be checked through a specific instruction; the connectivity of a server may be checked by a specific instruction; a configuration state of a relevant server may be checked by a specific instruction, and so on.

In 408, computing device 120 may generate detection data based on the above state. After all the above detection data is acquired, computing device 120 may generate system diagnostic information 130 in the form of a file from the detection data.

In this way, all required system diagnostic information can be collected very quickly after the system alarm is triggered. Since the operation is very close to a time stamp when the problem event occurs, the system diagnostic information is highly valuable, and also provides very useful information for a classification operation of different modules, thus saving human resources.

In some embodiments, process 200 may further include outputting system diagnostic information 130 for analysis when receiving an event associated with the target system alarm which is fed back by the user. In other words, computing device 120 can collect system diagnostic information corresponding to different system alarms in real time, and when a user feeds back a system alarm, provide system diagnostic information corresponding to the system alarm to a system developer. Alternatively, when an on-site technical support professional or a tester specifies a certain system alarm, computing device 120 may also provide system diagnostic information corresponding to the system alarm to the system developer.

In some embodiments, the system module may include at least one of a storage module, a display module, a computing module, and a network module.

The above process of collecting system diagnostic information is implemented based on the system alarm. Alternatively or additionally, it may also be implemented based on the problem event itself or another signal.

With the above embodiments, all required system diagnostic information can be collected after a system alarm is received, so that a developer can collect diagnostic information in a laboratory without communicating to the site for a long time and multiple times, thereby saving time and improving user experience. In addition, the operation of collecting diagnostic information is mainly directed to a system module associated with the system alarm, the system developer responsible for developing and maintaining a system module does not need to consult and analyze diagnostic information related to another system module, thereby saving human resources.

Figure 5:
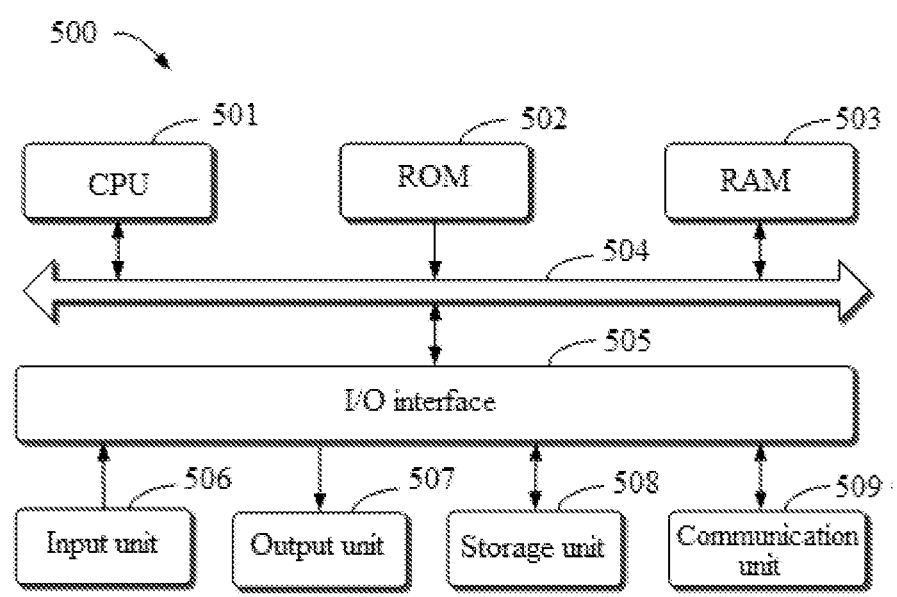
FIG. 5 is a schematic block diagram of an example device that can be configured to implement an embodiment of the present disclosure.

FIG. 5 is a schematic block diagram of example device 500 that can be configured to implement an embodiment of the present disclosure. As shown in the figure, device 500 includes central processing unit (CPU) 501 that can perform various appropriate actions and processing according to computer program instructions stored in read-only memory (ROM) 502 or computer program instructions loaded from storage unit 508 to random access memory (RAM) 503. Various programs and data required for the operation of device 500 can also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices over a computer network such as the Internet and/or various telecommunication networks.

The various processes and processing described above, for example, processes 200, 300, and/or 400, may be performed by processing unit 501. For example, in some embodiments, processes 200, 300, and/or 400 can be implemented as a computer software program that is tangibly included in a machine-readable medium such as storage unit 508. In some embodiments, some or all of the computer programs can be loaded and/or installed onto device 500 via ROM 502 and/or communication unit 509. When the computer program is loaded into RAM 503 and executed by CPU 501, one or more steps of processes 200, 300, and/or 400 described above may be implemented.

The present disclosure may be a method, an apparatus, a system, and/or a computer program product. The computer program product may include a computer-readable storage medium storing computer-readable program instructions for performing various aspects of the present disclosure.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium as used here is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object oriented programming languages such as Smalltalk and C++, as well as conventional procedural programming languages such as the "C" language or similar programming languages. The computer-readable program instructions may be executed completely on a user's computer, partially on a user's computer, as a separate software package, partially on a user's computer and partially on a remote computer, or completely on a remote computer or server. In the case where a remote computer is involved, the remote computer can be connected to a user computer over any kind of networks, including a local area network (LAN) or wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), can be customized by utilizing state information of the computer-readable program instructions. The electronic circuit can execute computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be appreciated that each block in the flowcharts and/or block diagrams and a combination of blocks in the flowcharts and/or block diagrams can be implemented by computer-readable program instructions.

The computer-readable program instructions can be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions cause the computer, the programmable data processing apparatus, and/or another device to work in a specific manner, such that the computer-readable medium storing the instructions includes an article of manufacture including instructions for implementing various aspects of functions/actions specified by one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer implemented process. In this way, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple embodiments of the present disclosure. In this regard, each block in the flowcharts or block diagrams can represent a module, a program segment, or a portion of an instruction that includes one or more executable instructions for implementing the specified logical functions. In some alternative implementations, functions labeled in the blocks may occur in an order different from that as labeled in the accompanying drawings. For example, two successive blocks may actually be performed basically in parallel, or they can be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various embodiments of the present disclosure have been described above, and the foregoing description is illustrative rather than exhaustive, and is not limited to the disclosed embodiments. Numerous modifications and changes are apparent to those of ordinary skill in the art without departing from the scope and spirit of the illustrated various embodiments. The selection of terms as used herein is intended to best explain the principles and practical applications of the various embodiments or technical improvements of technologies on the market, or to enable other persons of ordinary skill in the art to understand the embodiments disclosed here.

The invention claimed is:

1. A method for acquiring system diagnostic information, comprising: determining, according to determination that a received system alarm corresponds to a predefined to-be-monitored alarm, the received system alarm as a target system alarm, wherein the received system alarm indicates that a user of a network file system (NFS) cannot access an NFS share; determining a system module corresponding to the target system alarm based on a predefined mapping relationship between the system alarm and the system module, wherein the system module comprises a file interface and a server, wherein the system module is at least one of multiple system modules, wherein the relationship between the system alarm and the system module comprises a relationship between the to-be-monitored alarm and the server and a mapping between the predefined to-be-monitored alarm and the system module in a database stored in a storage apparatus, and wherein the mapping between the to-be-monitored alarm and the system module is preset by a corresponding system developer responsible for developing and maintaining the system module; and acquiring the system diagnostic information belonging to the system module and associated with the target system alarm, at least in part by reproducing a problem event using a relevant operation associated with the target system alarm, wherein the relevant operation is determined based on a system log entry of the system module corresponding to the target system alarm, and wherein the relevant operation comprises a specific instruction that checks connectivity of the file interface and another specific instruction that checks both connectivity of the server and a configuration state of the server.

2. The method of claim 1, wherein acquiring the system diagnostic information comprises:
acquiring the system log entry of the system module corresponding to the target system alarm; and
determining the system diagnostic information based on the system log entry.

3. The method of claim 1, wherein acquiring the system diagnostic information comprises:

acquiring detection data by detecting the system module based on the target system alarm; and
determining the system diagnostic information based on the detection data.

4. The method of claim 3, wherein acquiring the detection data comprises: acquiring the system log entry of the system module corresponding to the target system alarm; determining the relevant operation associated with the target system alarm from the system log entry; acquiring a state of the system module when the relevant operation is performed; and generating the detection data based on the state.

5. The method of claim 1, further comprising:
outputting, in response to receiving an event fed back by a user and associated with the target system alarm, the system diagnostic information for analysis.

6. The method of claim 1, wherein the system module comprises at least one of the following: a storage module, a display module, a computing module, and a network module.

7. An electronic device, comprising: at least one processing unit; and at least one memory coupled to the at least one processing unit and storing instructions configured to be executed by the at least one processing unit, wherein when executed by the at least one processing unit, the instructions cause the device to perform actions comprising: determining, according to determination that a received system alarm corresponds to a predefined to-be-monitored alarm, the received system alarm as a target system alarm, wherein the received system alarm indicates that a user of a network file system (NFS) cannot access an NFS share; determining a system module corresponding to the target system alarm based on a predefined mapping relationship between the system alarm and the system module, wherein the system module comprises a file interface and a server, wherein the system module is at least one of multiple system modules, wherein the relationship between the system alarm and the system module comprises a relationship between the to-be-monitored alarm and the server and a mapping between the predefined to-be-monitored alarm and the system module in a database stored in a storage apparatus, and wherein the mapping between the to-be-monitored alarm and the system module is preset by a corresponding system developer responsible for developing and maintaining the system module; and acquiring the system diagnostic information of the system module which is associated with the target system alarm, at least in part by reproducing a problem event using a relevant operation associated with the target system alarm, wherein the relevant operation is determined based on a system log entry of the system module corresponding to the target system alarm, and wherein the relevant operation comprises a specific instruction that checks connectivity of the file interface and another specific instruction that checks both connectivity of the server and a configuration state of the server.

8. The device of claim 7, wherein acquiring the system diagnostic information comprises:
acquiring the system log entry of the system module corresponding to the target system alarm; and
determining the system diagnostic information based on the system log entry.

9. The device of claim 7, wherein acquiring the system diagnostic information comprises:
acquiring detection data by detecting the system module based on the target system alarm; and
determining the system diagnostic information based on the detection data.

10. The device of claim 9, wherein acquiring the detection data comprises: acquiring the system log entry of the system module corresponding to the target system alarm; determining the relevant operation associated with the target system alarm from the system log entry; acquiring a state of the system module when the relevant operation is performed; and generating the detection data based on the state.

11. The device of claim 7, wherein the actions further comprise:
  outputting, in response to receiving an event fed back by a user and associated with the target system alarm, the system diagnostic information for analysis.

12. The device of claim 7, wherein the system module comprises at least one of the following: a storage module, a display module, a computing module, and a network module.

13. A computer program product having a non-transitory computer readable medium which stores a set of instructions to acquire system diagnostic information; the set of instructions, when carried out by computerized circuitry, causing the computerized circuitry to perform a method of: determining, according to determination that a received system alarm corresponds to a predefined to-be-monitored alarm, the received system alarm as a target system alarm, wherein the received system alarm indicates that a user of a network file system (NFS) cannot access an NFS share; determining a system module corresponding to the target system alarm based on a predefined mapping relationship between the system alarm and the system module, wherein the system module comprises a file interface and a server, wherein the system module is at least one of multiple system modules, wherein the relationship between the system alarm and the system module comprises a relationship between the to-be-monitored alarm and the server and a mapping between the predefined to-be-monitored alarm and the system module in a database stored in a storage apparatus, and wherein the mapping between the to-be-monitored alarm and the system module is preset by a corresponding system developer responsible for developing and maintaining the system module; and acquiring the system diagnostic information belonging to the system module and associated with the target system alarm, at least in part by reproducing a problem event using a relevant operation associated with the target system alarm, wherein the relevant operation is determined based on a system log entry of the system module corresponding to the target system alarm, and wherein the relevant operation comprises a specific instruction that checks connectivity of the file interface and another specific instruction that checks both connectivity of the server and a configuration state of the server.

* * * * *